(12) United States Patent
Ginsberg et al.

(10) Patent No.: US 6,556,978 B1
(45) Date of Patent: Apr. 29, 2003

(54) SATISFIABILITY ALGORITHMS AND FINITE QUANTIFICATION

(75) Inventors: Matthew L. Ginsberg, Eugene, OR (US); Andrew J. Parkes, Walsall (GB)

(73) Assignee: The State of Oregon acting by and through the State Board of Higher Education on Behalf of the University of Oregon, Eugene, OR (US)

( * ) Notice: Subject to any disclaimer, the term of this patent is extended or adjusted under 35 U.S.C. 154(b) by 0 days.

(21) Appl. No.: 09/520,920

(22) Filed: Mar. 8, 2000

Related U.S. Application Data
(60) Provisional application No. 60/123,537, filed on Mar. 9, 1999.

(51) Int. Cl.⁷ .............................. G06F 15/18; G06G 7/00
(52) U.S. Cl. ........................................... 706/19; 706/21
(58) Field of Search ...................... 706/19, 21

(56) References Cited

U.S. PATENT DOCUMENTS

| | | | |
|---|---|---|---|
| 5,636,328 A | 6/1997 | Kautz et al. ................ | 706/45 |
| 6,031,984 A | 2/2000 | Walser ........................ | 703/2 |

OTHER PUBLICATIONS

Folino et al, "Combining Cellular Genetic Algorithm and Local Search for Solving Statisfiability Problems", IEEE Conference on Tools with Artificial Intelligence, Nov. 1998.*

Nemer et al., "A Non–Deterministic Scheduling and Allocation Model for Mapping Algorithm on Configurable Architectures", IEEE Conference on Electrical and Computer Engineering, May 1997.*

Kautz, H. et al., "Planning as Satisfiability," Proceedings of the 10th European Conference on Artificial Intelligence (ECAI 92), Vienna, Austria, Aug. 1992. 1–12.

Sebastiani, R., "Applying GSAT to Non–Clausal Formulas," J. Artificial Intelligence Research 1 (1994) 309–314.

Selman, B. et al., "Local Search Strategies for Satisfiability Testing," Second DIMACS Challenge on Cliques, Coloring, and Satisfiability, Oct. 1993 1–17.

Selman, B. et al., "Noise Strategies for Improving Local Search," Proceedings of AAAI–94, Seattle, WA, Jul. 1994, 7 pp.

Papadimitriou, "On Selecting a Satisfying Truth Assignment," *Proc. 1991 FOCS*, IEEE Computer Society Press, pp. 163–169.

* cited by examiner

*Primary Examiner*—George B. Davis
(74) *Attorney, Agent, or Firm*—Fenwick & West LLP (57) ABSTRACT

Subsearch, where a satisfiability algorithm searches through the original theory for ground clauses that satisfy some numeric property, is represented in terms of S(C,P,u,s), the set of ground instances of C that have u literals unvalued by P and s literals satisfied by the assignments in P. This representation allows an intelligent search to be performed to answer subsearch problems posed in terms of S(C,P,u,s). Intelligent Subsearch uses truth value assignments to atoms to eliminate sets of bindings to universally quantified variables within a quantified clausal constraint; the bindings being eliminated because the bindings cannot satisfy a specific statement. Intelligent subsearch backtracks away from poor choices in the search for bindings to variables within the quantified clauses. In typical uses, intelligent subsearch can reduce the time of the checking problem from $O(D^U)$ to $O(D^{\alpha U})$ for some $\alpha < 1$.

61 Claims, 3 Drawing Sheets

FIG. 5

SATISFIABILITY ALGORITHMS AND FINITE QUANTIFICATION

CROSS-REFERENCE TO RELATED APPLICATION

This application claims the benefit of U.S. Provisional Application No. 60/123,537, filed Mar. 9, 1999.

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of contract no. F49620-92-J-0384, awarded by the Air Force Office of Scientific Research and contract nos. F30602-95-1-0023, F30602-97-1-0294, and F30602-98-2-0181, awarded by the Defense Advanced Research Laboratory and the Air Force Research Laboratory.

BACKGROUND OF THE INVENTION

1. Field of the Invention

This invention pertains in general to Boolean satisfiability algorithms and in particular to an improvement in the searching steps inherent in such algorithms.

2. Description of Related Art

The last few years have seen extraordinary improvements in the effectiveness of general-purpose Boolean satisfiability (SAT) algorithms. This work began with the application of the Walk-SAT (WSAT) algorithm to "practical" problems in a variety of domains, such as generative planning and circuit layout, by translating the problems into propositional logic and then solving them using WSAT.

Although WSAT is unchallenged in its ability to find models for randomly generated satisfiable theories, systematic methods have closed the gap on theories corresponding to practical problems. The algorithm of choice appears to be Relevance-bounded Learning (RELSAT), an extension of an idea from dynamic backtracking. RELSAT is systematic and can therefore deal with both satisfiable and unsatisfiable theories; for theories arising from practical problems, its performance is comparable to that of WSAT.

The applicability of propositional algorithms to practical problems is anything but straightforward, however. As the problems become more interesting, the problems' sizes grow enormously due primarily to occurrences of constraint axioms containing universally quantified parameters. A single axiom such as $$\forall xyz. \ [a(x,y) \land b(y,z) \rightarrow c(x,z)] \tag{1}$$

has $d^3$ ground instances if d is the size of the domain from which x, y and z are taken. The prior art has dealt with this difficulty by increasing computer memory and by finding clever axiomatizatidns for which ground theories remain manageably sized. In general, memory and cleverness are both scarce resources and a more natural solution is desired.

BRIEF SUMMARY OF THE INVENTION

The above needs are met by a method, computer program product, and computer system for using a procedure, such as a search procedure, to solve a constraint problem. The method, computer program product, and computer system, according to embodiments of the present invention, define a set of constraints for the constraint problem. The set of constraints includes one or more lifted constraints with universally quantified parameters. The procedure is formulated in terms of subsearch problems on the one or more lifted constraints. A search procedure, such as WSAT or Davis-Putnam, searches for a satisfying assignment and encounters the subsearch problems. Then, intelligent subsearch is used to answer the subsearch problems. Intelligent subsearch includes using backtracking searches to find relevant assignments to the universally quantified parameters within the one or more lifted constraints. One embodiment of the present invention performs intelligent subsearch on each lifted constraint and merges the results. From the results of the intelligent subsearch, it is possible to supply the information needed by the search procedure to make its decisions. The goal of the search procedure is to find an assignment Q satisfying the defined set of constraints.

One embodiment of the present invention formulates the search procedure in terms of subsearch problems on S(C,P,u,s), where S(C,P,u,s) represents a subset of grounded clauses that would be obtained by grounding a set of clauses C obtained from the defined set of constraints for the constraint problem and restricting the subset of clauses having u literals unvalued by an assignment P and s literals satisfied by the assignment P. In alternative embodiments, C can be the set of one or more lifted clauses, a set of clauses in a set of possibly lifted clauses produced using a literal 1, clauses learned by a search procedure, and clauses learned by the search procedure and restricted using a literal l.

In one embodiment of the present invention, at least one lifted constraint is a pseudo-Boolean constraint.

DETAILED DESCRIPTION OF THE INVENTION

Figure 1:
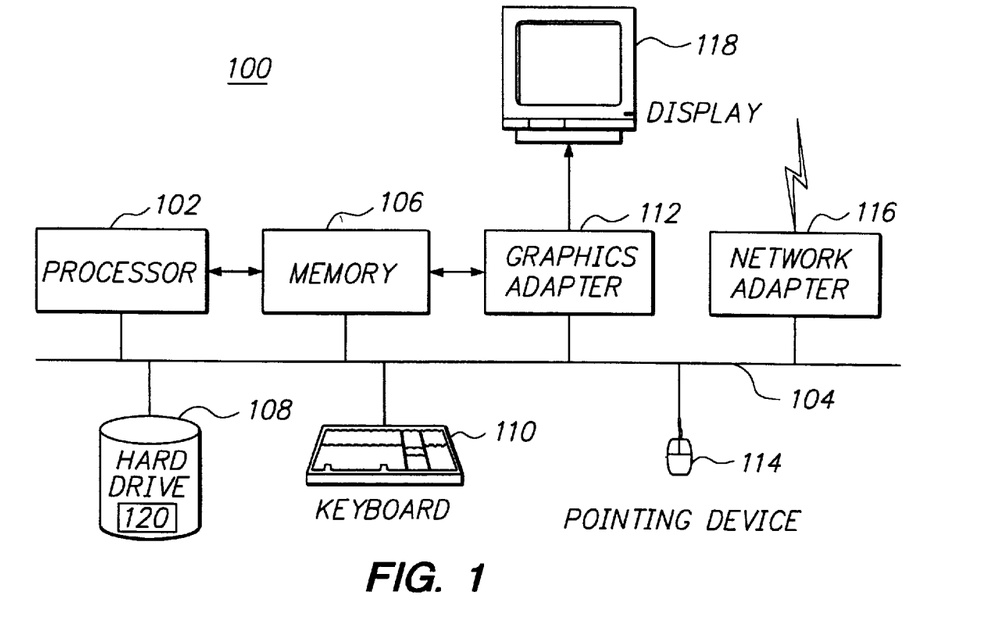
FIG. 1 is a high-level block diagram of a computer system for solving satisfiability problems according to an embodiment of the present invention.

FIG. 1 is a high-level block diagram of a computer system for solving satisfiability (SAT) problems according to an embodiment of the present invention. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112.

The at least one processor 102 may be any general-purpose processor such as an INTEL x86 compatible-, POWERPC compatible-, or SUN MICROSYSTEMS SPARC compatible-central processing unit (CPU). The storage device 108 may be any device capable of holding large amounts of data, like a hard drive, compact disk read-only memory (CD-ROM), DVD, or some form of removable storage device. The memory 106 holds instructions and data used by the processor 102. The pointing device 114 may be a mouse, track ball, light pen, touch-sensitive display, or other type of pointing device and is used in combination with the keyboard 110 to input data into the computer system 100. The network adapter 116 optionally couples the computer system 100 to a local or wide area network.

Program modules 120 for solving satisfiability problems using a lifted solver according to an embodiment of the present invention are stored on the storage device 108, loaded into the memory 106, and executed by the processor 102. Alternatively, hardware or software modules may be stored elsewhere within the computer system 100. In one embodiment of the present invention, the operation of the computer system 100 is controlled by the LINUX operating system, although other operating systems can be used as well.

In this description, a clause is a disjunction of literals, where a "literal" is a predicate or its negation. A "quantified" clause is built from predicates containing arguments with variables, and an overall quantification of the variables. If any of the quantifiers are existentials then just those quantifiers are removed; any existential quantifier is replaced with a disjunct of the possible bindings, thereby producing a clause with only universal quantifiers. For convenience, the clauses can be written as implications. For example, $$\forall xyz.\ [a(x,y) \wedge b(y,z) \rightarrow c(x,z)] \quad (1)$$

which is equivalent to the quantified clause $$\forall xyz.\ [\neg a(x,y) \vee \neg b(y,z) \vee c(x,z)].$$

An equivalent, "pseudo-Boolean," form is that in which predicates are valued "1" instead of true and "0"instead of false, for any predicate x, ¬x is replaced by a conjugate literal $\bar{x}$ with meaning (1−x), and the logical disjunction is replaced with a sum being greater than zero. For example, equation (1) can be written as $$\forall xyz.\ [(1-a(x,y))+(1-b(y,z))+c(x,z)>0]$$

or $$\forall xyz.\ [\bar{a}(x,y)+\bar{b}(y,z)+c(x,z)>0]$$

and, hence, can also occur as a quantified linear inequality. Since the above form, a "clausal inequality," is an identical constraint to that of equation (1), the present invention also works with this type of constraint, and such constraints are included within the definition of a "lifted clause" (which is synonymous with a "quantified clause").

Quantified clauses are commonly occurring constraints in encodings of realistic problems, and such problems have been solved, in general, by converting quantified clauses to standard propositional formulae. Solving the problem means finding truth value assignments (or, equivalently, 1 for true and 0 for false) to some or all of the atoms in such a way that each constraint is satisfied. For equation (1), the constraint is satisfied if and only if, for any choice of x, y, and z from their domains, at least one of the literals ¬a(x,y), ¬b(y,z), and c(x,z) is valued true (or 1). In the case of a systematic algorithm, such as Davis-Putnam, if no such solution exists then this result can be reported. A non-systematic method, such as Walk-SAT (WSAT), will attempt to find a solution but if it fails cannot report with certainty that no solution exists.

The prior art first converts to standard propositional form: The quantifiers are expanded (possible because the domains of quantification are finite), and the resulting set of predicates is then "linearized" by re-labeling all the atoms so that, for example, a(2,3) might become $v_{24}$. The number of ground clauses produced is exponential in the number of variables in the quantified clause.

The present invention works with the quantified formulation directly, as opposed to its much larger ground translation. Unfortunately, there are significant constant-factor costs incurred in doing so, since each inference step will need to deal with issues involving the bindings of the variables in question. Simply finding the value assigned to a(2,3) might well take two or three times as long as finding the value assigned to the equivalent $v_{24}$. Finding all occurrences of a given literal can be achieved in the ground case by simple indexing schemes, whereas in the quantified case this is likely to require a unification step. Such routine but essential operations can be expected to significantly slow the cost of every inference undertaken by the system.

While there are costs associated with using quantified axioms, there are significant savings as well. These savings are a consequence of the fact that the basic inference loop of existing Boolean satisfiability engines uses an amount of time that scales with the size of the theory; use of quantified axioms can reduce the size of the theory so substantially that the constant-factor costs can be overcome.

This description explains the present invention in three primary phases. First, this description reviews the WSAT and Davis-Putnam search algorithms. Next, this description identifies a computational subtask that is shared by these and all other existing algorithms. This subtask is NP-complete in a formal sense, and is called "subsearch" for that reason. This phase also explains why algorithms can be expected to encounter subsearch at each inference step, and rewrites the WSAT and Davis-Putnam algorithms to make the algorithms' use of subsearch problems explicit.

The third phase discusses other consequences of the fact that subsearch is NP-complete. Search techniques can be used to speed the solution of NP-complete problems, and subsearch is no exception. This phase also shows that subsearch cost dominates the running time on realistic instances and that quantified axiomatizations support the application of search techniques to the subsearch problem, and demonstrates that realistic examples are likely to lead to subsearch problems that can be solved much faster by intelligent subsearch than by the methods used by existing implementations of search algorithms.

As used herein, the phrase "intelligent subsearch" refers to performing an intelligent search to answer a subsearch problem. An "intelligent search" is a method that is better than generate-and-test. For example, backtracking search methods, from simple chronological backtracking to methods such as backjumping or dependency directed backtracking are methods of intelligent subsearch. Relevance-bounded learning (RELSAT) is another example of intelligent search. The intelligent search used for the subsearch can be different than the search process that produces the subsearch problems that need to be solved. For example, one embodiment of the present invention uses WSAT as the search process but uses chronological backtracking to perform the intelligent search (i.e., intelligent subsearch).

I. THE WSAT AND DAVIS-PUTNAM SEARCH ALGORITHMS

One version of the WSAT algorithm is described by the following pseudocode:

```
Procedure 2.1 (WSAT)
for i:= 1 to MAX-TRIES
    P:= a randomly generated truth assignment
    for j:= 1 to MAX-FLIPS
        if P is a solution, then return P
        else c:= a randomly selected unsatisfied clause
            foreach literal 1 ∈ c
                B(1) = number of clauses that would break if were to flip 1
                m = minimum value of B(1)
                L_m = {1|B(1) = m}
                If m = 0 then flip a random literal from L_o
                else
                    with probability p flip a random literal in c
                    else flip a random literal from L_m
                end if
            end foreach
        end if
    end for
end for
return failure
```

At each iteration, WSAT first checks to see if the problem has been solved. If not, it flips an atom either selected randomly from an unsatisfied clause or selected so as minimize the number of clauses that will change from satisfied to unsatisfied. Other versions of the algorithm use slightly different methods to select the literal, but these differences do not affect the issues involved in lifting.

The Davis-Putnam algorithm, in contrast, takes a problem C and computes solve(C,∅), where solve works with a partial assignment P of values to atoms, attempting to extend P to a satisfying assignment using depth-first search and unit-propagation after each branch:

```
Procedure 2.2 (Davis-Putnam)
To compute solve(C, P):
if unit-propagate(P) fails
    return failure
else
    set P := unit-propagate(P)
    if P is a solution, then return P
    v := an atom not assigned a value by P
    if solve(C, (P∪{v' = true}) succeeds
        then return solve (C, (P∪{v' = true})
    else
        return solve (P∪{v' = false}).
```

A crucial, but time-consuming, subroutine is unit propagation:

```
Procedure 2.3 (Unit propagation)
To compute unit-propagate(P):
while there is a currently unsatisfied clause c ∈ C that contains at most one unvalued
literal do
    if every atom in c is assigned a value by P,
        then return failure
    else a := the atom in c unassigned by P
        augment P by valuing a so that c is satisfied
    end if
end while
return P
```

This procedure assigns forced values to atoms by finding unsatisfied clauses containing single unassigned atoms, and valuing them in the way that satisfies the clause. The valued atoms are then propagated further. If unit propagation reveals the presence of a contradiction, the procedure returns failure. If unit propagation turns P into a solution, the procedure return that solution. Otherwise, the procedure picks a branch variable v and tries binding it to true and to false in succession. For example, if the given problem contained the clause a ∨¬b ∨ c and a had been valued false and b true by P, the procedure would conclude without branching that c must be true if the clause is to be satisfied. If there were an additional clause a ∨¬c in the problem, valuing c would value every atom in this clause without satisfying it, and unit propagation would return failure to indicate that a contradiction had been detected.

Effective implementations select the branch variable v to maximize the number of unit propagations that occur after v is valued, since each unit propagation reduces the size of the residual problem. This is typically done by identifying a set of candidate branch variables v', (generally by counting the number of binary clauses in which each such variable appears), and then computing unit-propagate (P∪{v'=true}) and unit-propagate (P∪{v'=false}) to see how many unit propagations actually take place. In practice, some effort is also made to order the values for v in a way that is likely to lead to a solution quickly. Also, in practice, the unit propagation will be done incrementally after the initial propagation. If a literal has just been set to "false," then it is only necessary to inspect clauses containing that literal. Clauses containing the negation of the literal, or neither the literal nor its negation, cannot yield new propagation.

Besides being used for search, as in the Davis-Putnam algorithm, propagation (and also the lifted form of propagation) can be used to simplify a theory. If the input theory contains unit literals, then it is standard to propagate out the effects of these literals, hence possibly generating further unit literals which can also be propagated. Another possibility is to use the propagation in order to check for "failed literals:"

A literal l is speculatively valued and the results propagated. If a contradiction is generated then ¬l must be entailed by the theory and so can be added to the set of initial constraints.

This process is attempted for some or all of the currently unvalued literals in the theory. This process can be repeated until no further simplifications result.

Some search or simplification procedures can also create new clauses as they work. Many existing search methods, such as RELSAT, will learn new clauses. New clauses can also be added to the theory by resolution. Since the lifted clauses are universally quantified first-order logic clauses, it is also possible to resolve them together in the usual fashion for first-order logic and produce a new lifted clause. Such new lifted clauses can be added to the initial set of clauses. The subsearch does not care where the lifted clauses come from, and so such new clauses can be treated together with, or in the same fashion as, the initially defined set of constraints. Further details on this point are disclosed in Parkes, A. J. (1999), "Lifted Search Engines for Satisfiability," Ph.D. thesis, University of Oregon, which is hereby incorporated by reference herein.

II. SUBSEARCH

Each iteration of either the WSAT or Davis-Putnam algorithm involves a search through the original theory for clauses that satisfy some numeric property. When WSAT seeks to flip the atom a that minimizes the number of newly unsatisfied clauses, it needs to count the number of clauses that contain a single satisfied literal and include a in its current sense; these are the clauses that will become unsatisfied when a is flipped.

In unit propagation, used both by the main loop in Davis-Putnam and by the step that selects a branch variable, the algorithm needs to find the currently unsatisfied clauses that contain precisely zero or one unvalued literals, and no satisfied literals. Even determining if a solution has been found involves checking to see if any clauses remain with zero satisfied literals.

All of these tasks can be rewritten using the following:
Definition 3.1:

Suppose C is a set of quantified clauses, and P is a partial assignment of values to the atoms in those clauses. $S(C,P,u,s)$ denotes the set of ground instances of C that have u literals unvalued by P and s literals satisfied by the assignments in P.

A "checking" problem is the problem of determining whether $S(C,P,u,s) \neq \emptyset$. A "subsearch" problem is an instance of the checking problem, or the problem of either enumerating $S(C,P,u,s)$ or determining its size.

To determine the complexity of the checking problem, first consider the checking problem for $S(C,P,0,0)$. Quantified clauses are handled separately. From the definition, it is clear that, when C is a set of clauses, then $S(C,P,0,0)$ is just the union of the sets $S(\{c\},P,u,s)$ for each individual clause c in C. Therefore, merging the results of the Subsearch problems on individual clauses is trivial: for the checking problem if any set is non-empty, then the final merged set is non-empty, and the size is just the sum of the sizes. Hence, just consider a single clause c. An element of $S(\{c\},P,0,0)$ corresponds to giving a value to each of the universally quantified variables in c in such a way that every literal in c is valued false by P. As an example consider (1) agape that is, suppose $$c = \forall xyz. \ [a(x,y) \land b(y,z) \rightarrow c(x,z)] \quad (2)$$

Finding $S(\{c\},P,0,0)$ corresponds to finding values for x, y and z such that $a(x,y) \land$ $b(y,z) \land$ $\neg c(x,z)$ Now, look at the literal $a(x,y)$ as a constraint on the tuple (x,y) with the allowed tuples being just those for which $a(x,y)$ is valued true by P. Similarly, the other two literals give constraints on (y,z) and (x,z). With this viewpoint, finding relevant values for the variables x, y and z corresponds to solving a Constraint Satisfaction Problem (CSP) with 3 constraints.

More generally, given a clause c, an associated CSP, dubbed the "sub-CSP" of the clause, can be produced. Each universally quantified variable becomes a variable of this sub-CSP. Each literal l of c becomes a constraint on the variable contained in l, the allowed values being just those which cause l to be false in P.

A satisfying assignment of this sub-CSP directly corresponds to value assignments for the universally quantified variables such that every literal is false, and hence to an unsatisfied ground clause from c. That is, solutions of the sub-CSP from c correspond to elements of $S(\{c\},P,0,0)$. Note that the sub-CSP is generally not a binary CSP. Also, the constraints, though not the constraint graph, depend on the current assignment P.

The conversion from a clause to a CSP does not impose any restrictions on the clause converted, and the resulting sub-CSPs are not of any special form. However, solving CSPs is NP-complete, which leads to the following theorem:

Theorem 3.2:

For fixed u and s, the checking problem is NP-complete.

Proof:

Checking is in NP, since a witness that $S(C,P,u,s) \neq \emptyset$ need simply give suitable bindings for the variables in each clause of C. To see NP-hardness, first consider the case u=s=0. The argument is essentially a formalization of the connection to a sub-CSP as discussed above.

Reduce from a binary CSP, producing a single clause c and set of bindings P such that, with $C=\{c\}$, $S(C,P,u,s) \neq \emptyset$ if and only if the original problem was satisfiable. The basic idea is that each variable in the constraint problem will become a quantified variable in c.

Suppose there is a binary CSP $\Sigma$ with variables $v_1, \ldots, v_n$, and with m binary constraints of the form $(v_{i1}, v_{i2}) \in \sigma_i$, where $(v_{i1}, v_{i2})$ is the pair of variables constrained by $\sigma_i$. For each such constraint, a corresponding binary relation $r_i(v_{i1}, v_{i2})$ is introduced, and c is taken to be the single quantified clause $$\forall v_1, \cdots, v_n \cdot \bigvee_i r_i(v_{i1}, v_{i2})$$

For the assignment P, $r_i(v_{i1}, v_{i2})$ is set to false for all $(v_{i1}, v_{i2}) \in \sigma_i$, and to true otherwise.

Since P values every instance of every $r_i$, $S(\{c\}, P,0,0)$ will be nonempty if and only if there is a set of values for $v_i$ such that every literal in $v_i$ $r_i(v_{i1}, v_{i2})$ is false. Since a literal $r_i(v_{i1}, v_{i2})$ is false only when the original constraint $\sigma_i$ is satisfied, it follows that $S(\{c\}, P,0,0) \neq \emptyset$ if and only if the original theory $\Sigma$ was satisfiable.

For the case of non-zero u or s, it is possible to reduce from the case of $S(\{c\},P,0,0)$. Given a clause c, create u new (nullary) literals $U_s$ and s new literals $S_i$. Define P' to be P together with assigning all the $S_j$ to true but leaving all the $U_i$ unvalued. Now define a new clause c' by $$c' = c \vee \bigvee_i U_i \vee \bigvee_j S_j$$

Then c' has precisely u unvalued and s satisfied literals if and only if c has neither unvalued nor unsatisfied literals. Finding $S(\{c'\}, P', u, s)$ corresponds to finding $S(\{c\},P,\mathbf{0},\mathbf{0})$. Hence, the checking problem for S(C,P,u,s) is also NP-hard.

The WSAT and Davis-Putnam algorithms can be recast in terms of the subsearch problems. For notational convenience in what follows, suppose that C is a theory and that l is a literal. $C_l$, also written as C(l), refers to that subset of the clauses in C that include l. If C contains quantified clauses, then $C_l$ will as well; the clauses in $C_l$ can be found by matching the literal l against the clauses in C.

A recasting of WSAT in terms of Definition 3.1 is as follows:

---

Procedure 3.3 (WSAT)
for i := 1 to MAX-TRIES
    P := a randomly generated truth assignment
    for j := 1 to MAX-FLIPS
        if S(C,P,0,0) = ∅, then return P
        else c := a random selection from S(C,P,0,0)
            foreach literal l ∈ c
                B(l) = |S(C$_\neg l$,P,0,1)|
            m = minimum value of B(1)
            L$_m$ = {1|B(l) = m}
            if m = 0 then flip a random literal from L$_o$
            else
                with probability p flip a random literal in c
                else flip a random literal from L$_m$
            end if
        end if
    end for
end for
return failure

---

When selecting the literal l to flip, recall that l is currently false. Then $|S(C\neg l, P,\mathbf{0},\mathbf{1})|$ is the number of ground clauses that will become unsatisfied when l is flipped from false to true. Just as WSAT appeals to subsearch, so does unit propagation:

---

Procedure 3.4 (Unit propagation)
while S(C, P, 0, 0) ∪ S(C, P, 1, 0) ≠ ∅ do
    if S(C, P, 0, 0) ≠ ∅, then return failure
    else select c ∈ S(C, P, 1, 0)
        augment P so that c is satisfied
    end if
end while
return P

---

In Davis-Putnam, $S(C,P,\mathbf{0},\mathbf{0})$ corresponds to clauses that can never be satisfied and, therefore, generate a backtrack, and $S(C,P,\mathbf{1},\mathbf{0})$ corresponds to clauses generating forced values by unit propagation.

For the literal selection in Davis-Putnam, as mentioned above, it is often useful to build heuristic measures of the number of propagations that would be caused by setting a literal l to true. This measuring can be approximated by counting the clauses that contain ¬l and also are effectively binary. For this measuring to be accomplished, there must be clauses containing precisely two unvalued literals, with one literal being ¬l. In terms of subsearch, this simply corresponds to the set $S(C\neg l,P,\mathbf{2},\mathbf{0})$, and the relevant subsearch problem is to find the size of this set, that is, to find |S(C$\neg$l,P,2,0)|. Further details on this point are disclosed in Parkes, A. J. (1999), "Lifted Search Engines for Satisfiability," Ph.D. thesis, University of Oregon, which is hereby incorporated by reference herein.

A preferred embodiment of the present invention computes S(C,P,u,s) once during an initialization phase, and then updates it incrementally. For example, suppose that a literal l is changed from unvalued to true, changing the partial assignment from P to P'=P U{l=true}. To compute the number of fully assigned but unsatisfied clauses after the update, start with the number before, and add newly unsatisfied clauses (unsatisfied clauses previously containing the single unvalued literal l). In other words, a rule such as:

S(C,P',0,0)=S(C,P,0,0)US(C¬l,P,1,0)

is used to perform the incremental updating of S(C,P, 0,0). Similar rules are used to perform other incremental updating. Similarly, propagation can and should be done incrementally after initial propagation or simplification. If a ground literal l has just been set to false in the search, then the immediate propagation can arise from only clauses involving that literal. Hence, the subsearch can be restricted to the set $C_l$. That is, the propagation can be implemented incrementally by reformulation in terms of sets such as $S(C_l,P,\mathbf{1},\mathbf{0})$. More information on this point is found in sections 5.7 and 7.2 of Parkes, A. J. (1999), "Lifted Search Engines for Satisfiability," Ph.D. thesis, University of Oregon, which is hereby incorporated by reference herein. Reorganizing the computation in this way leads to substantial speedups, since the subsearch problem being solved no longer involves the entire theory C but smaller theories such as $C_l$ or C¬l.

As shown above, the running time of existing satisfiability algorithms is dominated by the time spent solving subsearch problems, since such time is potentially exponential in the size of the subtheory $C_l$ when the literal l is valued, unvalued or flipped. However, one of the primary lessons of recent satisfiability research is that even problems that are NP-hard in theory tend strongly to be much easier on average than worst-case analyses would suggest.

First, note that subsearch is not likely to be much of an issue for the randomly generated satisfiability problems that have been the focus of recent research and that have driven the development of algorithms such as WSAT. The reason for this is that if n is the number of clauses in a theory C and v is the number of variables in C, then random problems tend to be difficult only for very specific values of the ratio n/v. For 3-SAT (where every clause in C contains exactly three literals), difficult random problems appear at n/v 4.2. For such a problem, the number of clauses in which a particular literal l appears is small (on average 3×4.2/2=6.3 for random 3-SAT). Thus, the size of the relevant subtheory, $C_l$ or C¬l, will also be small, and while subsearch cost still tends to dominate the running time of the algorithms in question, there is little to be gained by applying sophisticated techniques to reduce the time needed to examine a relative handful of clauses.

For realistic problems, the situation is dramatically different. Here is an axiom from a logistics domain encoded in the "planning as satisfiability" or SATPLAN style described in Kautz, H. and Selman, B. (1992), "Planning as Satisfiability," Proceedings of the 11th European Conference on Artificial Intelligence (ECAI-92), pages 359–363, which is hereby incorporated by reference:

$$\text{at } (o,l,t) \land \text{flight-time}(l,l', dt) \land \text{between}(t,t',t+dt) \to \neg \text{at}(o,l',t') \quad (3)$$

This axiom says that if an object o is at location l at time t and it takes time dt to fly from l to l', and t' is between t and t+ dt, then o cannot be at l' at t'.

A given atom of the form at (o,l,t) will appear in $|t|^2|l|$ clauses of the above form, where $|t|$ is the number of time points or increments and $|l|$ is the number of locations. Even if there are only 100 of each, the $10^6$ axioms created seem likely to make computing $S(C_i, P, u, s)$ impractical.

However, if the work done directly by the search engine itself is distinguished from the work done indirectly by solving subsearch problems, the work done directly will scale more slowly with the problem size (e.g. as measured by the largest domain size) than the subsearch problems. In the case of Davis-Putnam, the search will have to maintain the partial assignment P and so be driven by the number of variables. However, the subsearch involves scanning the clauses, and so will be driven by the number of clauses. Generally, the number of clauses involved in the subsearch will be larger than the number of variables involved in any subsequent change to the state P; for the example above, the subsearch might need to consider the $10^6$ clauses to derive just one forced literal. For WSAT, the search not only maintains P but also stores and manipulates the set of unsatisfied clauses. However, in practice, the set of unsatisfied clauses again tends to be much smaller than the set of all clauses.

The search itself is generally a matter of doing subsearch on clauses in order to make changes to some current state of the search engine. The size of this state is typically driven by the number of variables. However, on realistic problems, like that shown by equation (3), the number of clauses is likely to increase more rapidly with problem size than the number of variables. Thus, the costs associated with subsearch dominate the runtime for realistic problems.

Next, examine the computation of $S(C_i,P,u,s)$ in more detail. Suppose that there is an atom a=at (O,L,T) for fixed O, L and T, and it is desired to count the number of unit propagations that will be possible if a is set to true. In other words, it is desired to know how many instances of (3) will be unsatisfied and have a single unvalued literal after a is set to true.

Prior art implementations, faced with this problem (or an analogous one if WSAT or another approach is used), considered axioms of the form (3) with o, l and t fixed but with l', t' and dt allowed to vary. These implementations examined every axiom of this form to find the possible unit propagations. The implementations took this approach because prior art systems did not use quantified clauses such as that of (3), but instead used the set of ground instances of those clauses. Computing S(C,P,u,s) for ground C involves simply checking each axiom individually.

Set against the context of a quantified axiom, however, this prior art approach is inappropriate. Computing S(C,P, u,s) for a quantified C by reducing C to a set of ground clauses and then examining each clause is equivalent to solving the original NP-complete problem by generate and test, which is not effective.

Returning to the example given above in equation (3), with at(O, L, T) true, the search is for variable bindings for l', dt and t' such that, amongst ¬ flight-time(L, l', dt), ¬ between(T, t', T+dt), and ¬ at(O, l', t'), precisely two of these literals are false and the third is unvalued. Theorem 3.2 suggests that subsearch will be exponentially hard (with respect to the number of quantifiers) in the worst case.

In practice, however, the subsearch is not as bad as the worst case. Suppose that for some possible destination l', the flight-time(L, l', dt) is known to be false for all dt except some specific value $\Delta$. All bindings for dt except for dt=$\Delta$ can be ignored, thereby reducing the size of the subsearch space by a factor of $|t|$. If $\Delta$ depended on previous choices in the search (aircraft loads, etc.), however, it would be impossible to perform this analysis in advance and remove the unnecessary bindings in the ground theory.

Pushing this example further, suppose that $\Delta$ is so small that T+$\Delta$ is the time point immediately after T. In other words, between (T, t', T+$\Delta$) will always be false, so that ¬ between(T, t', T+$\Delta$) will always be true and no unit propagation will be possible for any value of t'. It is possible to "backtrack" away from the unfortunate choice of l in the subsearch for variable bindings for which unit propagation is possible. Such backtracking is not supported by the generate-and-test subsearch philosophy used by prior art implementations.

This sort of computational savings is likely to be possible in most cases. For naturally occurring theories, most of the atoms involved are likely to be either unvalued (because the truth values have not yet been determined) or false (by virtue of the closed- world assumption). Domain constraints will typically be of the form $a_i \land \ldots \land a_k \to l$, where the premises $a_i$ are atoms and the conclusion l is a literal of unknown sign. Unit propagation (or other likely instances of the subsearch problem) will thus involve finding a situation where at most one of the $a_i$ is unvalued, and the rest are true.

To determine the average complexity of subsearch, suppose that the largest domain size is D and there are clauses with up to U variables. For a ground solver, the checking problem takes time $O(D^U)$, exponential in the length of the clauses. When the number of variables U is not too small, intelligent subsearch can reduce the complexity to $O(D^{\alpha U})$ for some $\alpha<1$, if not better.

III. EXPERIMENTAL RESULTS

To examine the impact of the present invention in an experimental setting, the performance of ground (i.e., prior art) and lifted solvers (i.e., solvers according to the present invention) were compared on problems of a variety of sizes from a simple logistics planning domain. Note that the experiments measure the basic step rate of the underlying search engine, not the time to solution. The experiments measure the overheads from lifting and see whether or not they swamped the savings. All experiments were run under Linux on a 400 MHz Pentium II with 256 MB of memory.

Figure 2:
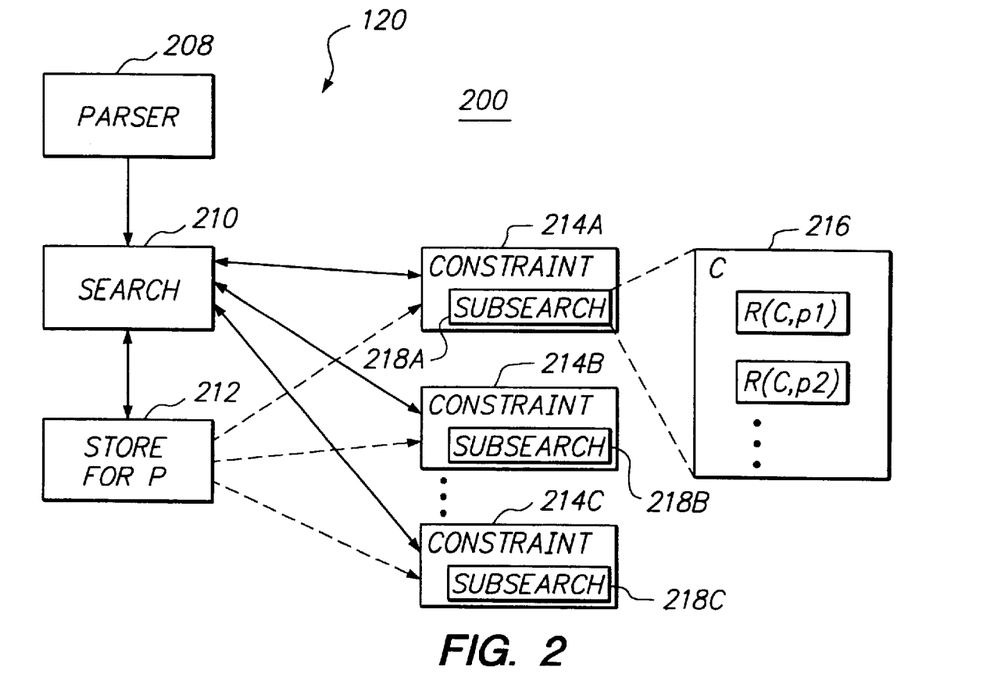
FIG. 2 is a block diagram illustrating an architecture for the software modules for implementing a lifted solver according to an embodiment of the present invention.

FIG. 2 is a block diagram illustrating an architecture for the software modules 120 for implementing a lifted solver 200 according to an embodiment of the present invention to generate the experimental results described below. In one embodiment, the lifted solver 200 is implemented in C++ and the object-oriented nature is carried throughout the architecture. Illustrated are a parser 208 for parsing an input, a search engine 210 for controlling the current state P and a storage 212, such as the memory 106, for storing the current state P. The search engine 210 communicates with the parser 208 and multiple constraints 214A, 214B, 214C. Each constraint, of which constraint 214A is representative, manages one or more clauses 216 and the clauses' associated subsearch engine 218. The search engine 210 and the subsearch engine 218 refer to separate search spaces. For the search engine, the "variables" are the predicates, such as c(x,z), and the aim of the search is to find assignments to the predicates that satisfy all the constraints. For the subsearch, the "variables" are the universally quantified parameters that occur in lifted constraints, and the goal of the subsearch is to find bindings, or sets of bindings, that give information needed by the search engine.

In one embodiment, the lifted solver accepts as input universally quantified clauses, although a single existential quantifier is allowed in the input for convenience in dealing with certain axioms. Internally, the parser 208 converts the existential quantifier into an appropriate disjunction. For convenience, the values of some fixed predicates such as equality and "less than" are predefined within the solver and do not need to be defined within the input.

In practice, the parser 208 parses the input clauses and passes its output to the solver 210. The solver instantiates an object for each quantified clause. In one embodiment, the class holding a clause c stores the clause and also builds, and indexes, the quantified $R^-(c,l)$ and $R^-(c,\neg l)$ for every literal l appearing in c. These are used in order to handle incremental changes. The equivalent step in a ground solver is indexing the set of clauses to support direct access to all clauses containing a given literal. A difference in the lifted case is that since the clauses themselves are small, it is possible to make copies and use bindings of variables instead of having to index all the ground literals.

After the clauses and sub-clauses are built, the clauses and sub-clauses are prepared for subsearch. This step includes organizing the literals into a structure allowing subsearch over the literals using a backtracking search. An embodiment of the present invention builds the equivalent of a set of nested "for loops" using recursion. The literals are hoisted out of the inner loops and placed so that the literals are tested as soon as the literals are ground.

In one embodiment, the variable assignment P is stored in the storage 212 in a ground form with a byte for storing the value of each atom. Storage is preferably accessed as a multi-dimensional array.

In WSAT, the storage 212 stores the set of unsatisfied clauses, $S(C,P,0,0)$ explicitly. These unsatisfied clauses are stored with the quantified clauses from which they arise. The main search algorithm needs to know the size of $S(C,P,0,0)$ so that, in the random walk step, it can do a uniform selection over all the $S(C,P,0,0)$ from all the constraints. If a ground clause is selected for fixing, then the literals from the clause are passed back to the main search routine so that their heuristics can be evaluated. A major fraction of the effort expended within the object goes into evaluating the breaks that result from flipping a literal.

In one embodiment, subsearch is done by building data structures that enable a set of nested for loops to be simulated with appropriate pruning conditions and actions on reaching the innermost statements. Accordingly, backtracking search is done with a static variable order. The order used can sometimes make a difference to the subsearch. However, picking a good order can be done for the domain as a whole rather than needing to be done for every problem instance separately. In one embodiment, the solver uses the order of variables as given in the input clause. The responsibility for picking a good order is given to the system that produces the domain axioms. An alternative embodiment of subsearch according to the present invention selects its own ordering using probabilistic analysis of the clauses and expected assignments for the literals.

The experimental domain consists of objects and airplanes; the locations are given as a function of time by means of predicates such as aboard(o, a, t) for an object o, airplane a and time t. The only actions are loading or unloading objects onto planes and flying the planes. Unlike the example utilized above, in the experiments all flights are assumed to be of unit duration. The experiments use axioms such as:

$\forall aboi.$ $a=b \vee \neg\ aboard(o,a,i) \vee \neg\ aboard(o,b,i)$ (4)

$\forall aoci.$ $\neg\ at(o,c,i) \vee \neg\ aboard(o,a,i+1) \vee \text{plane-at}(a,c,i)$ (5)

The first axiom is a consistency condition on the state; the second axiom requires the relevant plane to be at the airport when loading an object.

The experiments use WSAT to solve problems that use N aircraft to redistribute O(N) objects that were initially located at random among O(N) cities. The length of the optimal plans is independent of N. The number of variables is $O(N^2)$ and the number of clauses is $o(N^3)$.

The theories were simplified before being presented to WSAT by propagating unit literals and unit propagating to completion. For the case of lifted axioms, the experiments use a lifted implementation of propagation. These simplifications produce somewhat smaller theories. The ground solver can exploit the smaller theories by entirely removing forced variables and satisfied clauses. However, in the lifted case such removals are not done as the removals would require breaking up the simple quantified structure. For example, if the simplification sets aboard(0,0,0) to false, the ground case can remove that literal and associated clauses entirely, whereas the lifted case still stores the literal (keeping it fixed at false) and the full set of axioms. This difference tends to favor the ground axiomatizations as opposed to lifted ones.

After doing the simplification using the lifted implementation of propagation (or a simplification method such as checking for failed literals by using such propagation), the literals discovered by this process can also be output. In some cases, it might be better to do the simplification using the lifted implementation of propagation and then ground out the simplified theory. The ground out simplified theory can be solved using a standard ground implementation of a solver. This process of grounding out the theory can use the discovered literals in order to produce a smaller ground theory: if the lifted simplification discovers that a literal is true then the grounding process can avoid emitting such clauses. This process can be useful in cases in which the original theory is too large to be grounded, but there is so much simplification that the simplified theory leads to a small enough grounded theory to be usable.

Also, the grounding process itself can be formulated as a subsearch problem. The grounding process corresponds to enumerating all grounding clauses with no satisfying literals, and hence to determining $S(C,P,u,s)$ with u allowed to be arbitrary. This subsearch problem can again be solved using backtracking methods to enumerate all bindings of the universally quantified parameters, and pruning (backtracking) whenever the bindings give a satisfying literal within the clause. A binding to all the universally quantified parameters will then correspond to an unsatisfied clause. Any false literals should then be removed and the resulting ground clause, containing only unvalued literals, can be emitted. Using backtracking for the subsearch can hence produce all the ground clauses corresponding to the simplified theory. More generally, any search method capable of producing all the solutions of a problem can also be used for this subsearch problem.

The lifted solver takes lifted clauses as input and solves the subsearch problems using a straightforward depth-first search over the values of the universally-quantified variables, pruning the (sub)-search when possible as described above.

Figure 3:
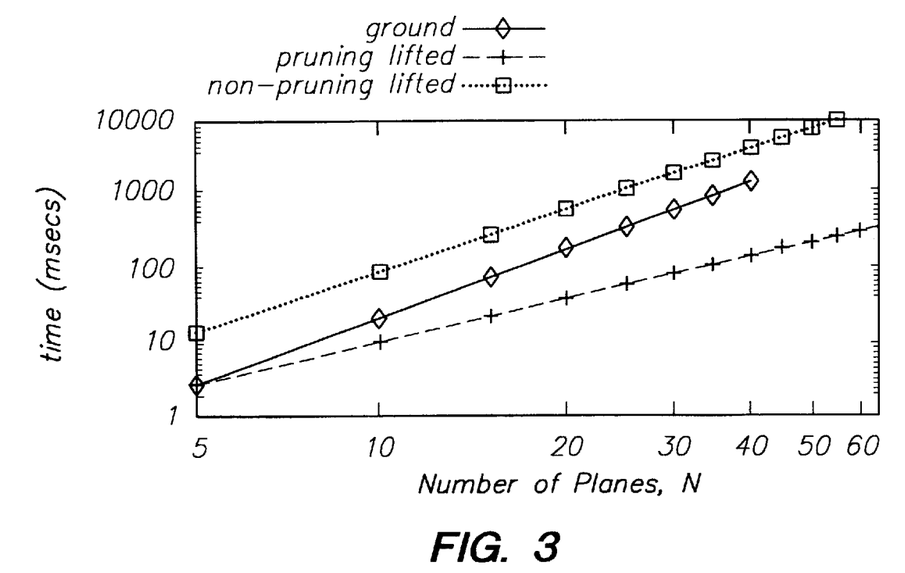
FIG. 3 is a graph illustrating CPU time needed, during initialization in WSAT, to find the set of unsatisfied clauses.

First consider the time taken to initialize WSAT by counting the numbers of unsatisfied clauses after the initial variable assignment. FIG. 3 is a graph illustrating CPU time needed, during initialization in WSAT, to find the set of unsatisfied clauses. The graph illustrates the initialization times for the ground and the lifted solver with and without pruning enabled. Note that this experiment operated with a slightly modified version of WSAT. Normally, WSAT initially assigns literals true or false with equal probability. Instead, for both lifted and ground solvers, the experiments biased the assignment towards setting literals to false. This bias is natural because any solution of the axioms will have a similar bias; it also reduces the time spent by WSAT in its initial hill-climbing phase and can reduce the total number of flips needed.

Except for small values of N, ground WSAT scales as $O(N^3)$, predictably proportional to the number of clauses, whereas the lifted scales as $O(N^2)$. To see that this is to be expected, consider that axioms such as (5) dominate the runtime. The subsearch for unsatisfied clauses can be terminated whenever at(o,c,i) is false. This pruning is likely to be common because of the weighting of the initial assignment, or more generally because objects should only be in one city. Hence, the subsearch involving this axiom is reduced from size ocia to size oci. The former is of size $O(N^3)$, while the latter is only of size $O(N^2)$ (recall that the number of time points is independent of N). Solving the subsearch problem efficiently improves the complexity of initialization.

Next, consider flip performance. For this consideration, the experiments use two implementations of WSAT: WSAT (U) and WSAT(UB). WSAT(U) stores and maintains the set of unsatisfied clauses. WSAT(UB) stores and maintains the set of unsatisfied clauses and also maintains an integer, the "breakcount," for each literal. The breakcount of a variable is the number of clauses that would become unsatisfied if that variable were to be flipped and its usage generally improves the fliprate. Note that the implementation used for the initialization experiments is WSAT(U) since initializing the breakcounts is more complex than initializing the unsatisfied clauses.

Figure 4:
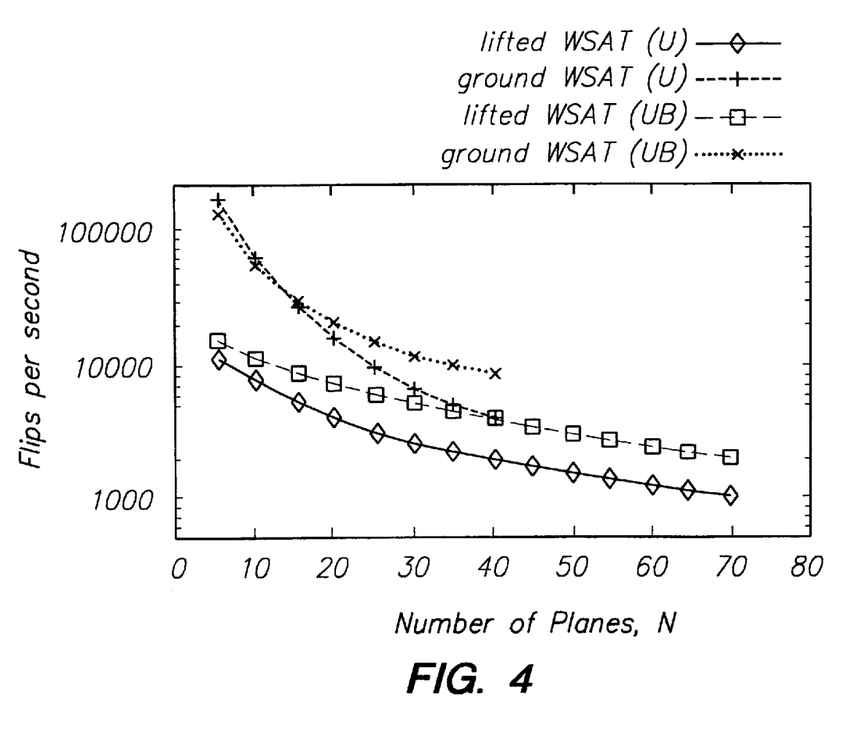
FIG. 4 is a graph illustrating flips per second for various versions of WSAT as determined by the results of the flip performance experiments.

FIG. 4 is a graph illustrating flips per second for various versions of WSAT as determined by the results of the flip performance experiments. The ground lines terminate at N=40 because beyond that point memory usage, growing as $O(N^3)$ for the ground solver, exceeds physical memory. One embodiment of the lifted solver runs out of memory at about N=300, corresponding to billions of ground clauses.

Ground WSAT outperforms the lifted version but the difference drops rapidly as the size of the problem increases. More precisely, for WSAT(UB) the time per flip should be linear in the problem size N. Experimentally, the leading terms are 7.2 N μsec/flip for the lifted solver as compared to about 3.5 N for the ground solver. Thus, for large problems the lifted solver is about twice as slow. Note that the overheads tend to be worse on the smaller problems.

It is important to note here that the axiomatization used to encode the domain has a structure that should show no gain from pruning. Had the underlying theory allowed efficient solution of subsearch problems, one could expect better scaling properties, and that the better scaling would easily overcome the small constant overhead.

The description above mentioned that WSAT(UB) would not achieve any savings from intelligent subsearch on the initial set of axioms. Here is an example of an axiom for which even WSAT(UB) can achieve significant savings:

$$i+1<k \land c \neq d \rightarrow [(at(o,c,i) \land plane\text{-}at(a,c,i) \land at(o,c,k) \land plane\text{-}at(a,d,k)) \rightarrow aboard(o,a,i+1)] \quad (6)$$

Figure 5:
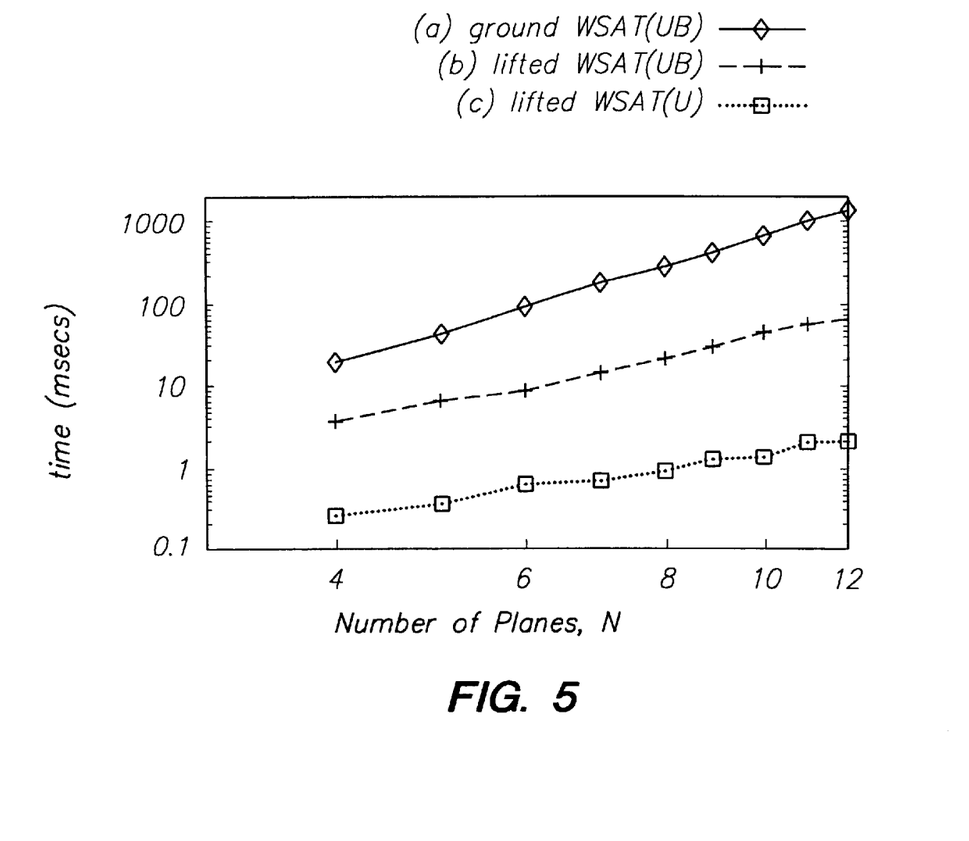
FIG. 5 is a graph illustrating experimental results for initializing an axiom having $O(N^4)$ ground clauses.

This axiom says that if a plane is going to the destination of a package then the package should be loaded immediately. This axiom contains $O(N^4)$ ground clauses, which dominate the initialization time for ground WSAT(UB). However, the expected initialization time for lifted WSAT(UB) is $O(N^3)$, and the expected initialization time for WSAT(U) is just $O(N^2)$. FIG. 5 is a graph illustrating experimental results for initialization for this axiom. Note that both axes have logarithmic scales. Line (a) scales as $N^4$, line (b) scales as $N^3$, and line (c) scales as $N^2$.

In one embodiment of the present invention, the lifted solver uses relatively simple methods. Alternative embodiments of the present invention can improve the lifted solver in a number of ways, such as, for example, doing a better subsearch. One embodiment of the present invention uses depth-first search with static ordering of the variables. There are many other intelligent subsearch methods, such as sub-CSP, described in Parkes, A. J., "Lifted Search Engines for Satisfiability," that might do better.

One embodiment of the present invention stores state as explicit multi-dimensional arrays of true, false, or unset values. In realistic instances, the states are typically very structured. For example, the states may be biased towards false, or have many "adjacent" values being equal. In these instances, an alternative embodiment of the present invention can use advanced data structures, such as Boolean Decision Diagrams, that take advantage of this structure and result in more compact representation and faster data access.

In addition, an alternative embodiment of the present invention selectively grounds clauses. The experiments demonstrate that, for some lifted clauses, intelligent subsearch will never show any gains over the ground case. If such lifted clauses do not generate too many ground clauses, then the lifted clauses can be selectively ground out in order to avoid the overhead of lifting. Indeed, this embodiment might only keep as lifted the clauses that will gain from the intelligent subsearch or are simply too large to ground out. An alternative embodiment can store fictions, or partial functions, and then define the predicates in terms of these functions or partial functions. For example, instead of explicitly storing the predicate aboard(o, a, t), the predicate can be derived from a partial function aboard(o,t) giving the airplane, if any, upon which object o is aboard at time t. Subsearch methods still apply even with such implicit, rather than explicit, storage of the predicates. Intelligent search can still be used, by the subsearch, to find the relevant sets of values for the universally quantified variables.

More complex constraints can make better use of intelligent subsearch: the larger the subsearch problem the larger the potential savings. Such larger axioms might arise in various ways. It is often possible to add clauses that are redundant in the sense of being logical consequences of the axioms but that can help the search by improving propagation properties. Alternative embodiments of the present invention can add soft constraints that merely improve the quality of the plans. These alternative embodiments might even add clauses designed to supply some domain-specific knowledge to guide the search engine itself, as discussed in Kautz, H. and Selman, B., "Planning as satisfiability." These added clauses and constraints can lead to a large explosion in the size of the ground theory and, therefore, require the use of a lifted solver.

In summary, satisfiability algorithms have generally been developed against the framework provided by either random instances or, worse still, no unbiased source of instances at all. The algorithms themselves have thus tended to ignore problem features that dominate the computational requirements when they are applied to large real problems.

Principal among these problem features is subsearch, arising from the fact that most computational tasks involving realistic problems are NP-complete in the size of the quantified theory. This description demonstrates that, while subsearch is NP-complete in the size of the underlying theory, it is amenable to the gains that can be expected from intelligent search methods.

This description describes the performance of a generalization of WSAT that is capable of dealing with universally quantified theories. For large theories, at worst, this generalization runs only modestly more slowly than the original ground WSAT. In some cases, the generalization can use intelligent subsearch to achieve substantial savings. The generalization is also capable of solving problem instances for which ground WSAT would exhaust the physical memory available.

We claim:

1. A computer-implemented method of generating at least a partial solution to a constraint problem, comprising the steps of:
    defining a set of constraints for the constraint problem, the set of constraints including one or more lifted constraints with universally quantified parameters;
    applying a procedure to the constraint problem, the procedure for finding the at least partial solution;
    formulating the procedure in terms of subsearch problems on the one or more lifted constraints with universally quantified parameters;
    performing intelligent subsearch to answer the Subsearch problems on the lifted constraints with universally quantified parameters;
    determining, responsive the results of the intelligent subsearch, properties of an assignment Q satisfying the defined set of constraints; and
    outputting the properties of Q as the at least partial solution to the constraint problem.

2. The method of claim 1, wherein the procedure is a search procedure.

3. The method of claim 2, wherein the search procedure is Walk-SAT.

4. The method of claim 2, wherein the search procedure is a Davis-Putnam procedure.

5. The method of claim 1, wherein the procedure is a simplification procedure for finding facts entailed by the constraint problem.

6. The method of claim 1, wherein the procedure is a propagation procedure for finding facts entailed by the constraint problem.

7. The method of claim 1, wherein the formulating step comprises the step of:
    formulating the procedure in terms of subsearch problems on $S(C,P,u,s)$, where $S(C,P,u,s)$ represents a subset of grounded clauses that would be obtained by grounding a set of clauses C obtained from the defined set of constraints for the constraint problem and restricting the subset to clauses having u literals unvalued by an assignment P and s literals satisfied by the assignment P.

8. The method of claim 7, wherein the procedure is a search procedure and further comprising the step of:
    searching for properties of the assignment Q satisfying the defined set of constraints, the searching encountering the subsearch problems on $S(C,P,u,s)$ for assignments P encountered responsive to the search.

9. The method of claim 8, wherein the step of performing intelligent subsearch answers the subsearch problems on $S(C,P,u,s)$.

10. The method of claim 8, wherein the search procedure has the ability to learn lifted clauses during searching and the set of clauses C in $S(C,P,u,s)$ includes lifted clauses learned by the search procedure.

11. The method of claim 10 wherein the lifted clauses learned by the search procedure are obtained responsive to resolution of existing lifted clauses.

12. The method of claim 11, further comprising the steps of:
    defining a literal l; and
    restricting the lifted constraints learned by the search procedure using the defined literal l to produce a set of possibly lifted clauses C(l) having the property that each ground clause obtainable from C(l) contains the literal l;
    wherein the set of clauses C in $S(C,P,u,s)$ is the set of possibly lifted clauses C(l).

13. The method of claim 8, wherein the searching step comprises the steps of:
    searching through a sequence of possibly partial assignments P; and
    for each possibly partial assignment P in the sequence, performing intelligent subsearch to answer the subsearch problems.

14. The method of claim 7, wherein the one or more lifted constraints comprise one or more lifted clauses and wherein C in $S(C,P,u,s)$ is a set of the one or more lifted clauses.

15. The method of claim 7, further comprising the steps of:
    defining a literal l; and
    restricting the defined set of constraints using the defined literal l to produce a set of possibly lifted clauses C(l) having the property that each ground clause obtainable from C(l) contains the literal l;
    wherein the set of clauses C in $S(C,P,u,s)$ is the set of possibly lifted clauses C(l).

16. The method of claim 1, wherein the step of performing intelligent subsearch comprises the steps of:
    performing intelligent subsearch on each lifted constraint in the set to produce a result for each lifted constraint; and
    merging the result of each lifted constraint into a merged result.

17. The method of claim 1, wherein the step of performing intelligent subsearch comprises the step of:
    using backtracking searches to find relevant assignments to the universally quantified parameters within the one or more lifted constraints.

18. The method of claim 1, wherein the step of performing intelligent subsearch comprises the step of:
    converting the subsearch problems into constraint satisfaction problems;
    wherein the intelligent subsearch works on the constraint satisfaction problems to answer the subsearch problems.

19. The method of claim 1, wherein at least one lifted constraint is a pseudo-Boolean constraint having one or more universally quantified parameters.

20. The method of claim 1, wherein the constraint problem defined by the set of constraints is a generative planning problem and wherein the properties of Q are at least a partial solution to the generative planning problem.

21. The method of claim 1, wherein the constraint problem defined by the set of constraints is a circuit layout problem and wherein the output properties of Q are at least a partial solution to the circuit layout problem.

22. The method of claim 1, wherein the constraint problem defined by the set of constraints is a logistics problem and wherein the output properties of Q are at least a partial solution to the logistics problem.

23. The method of claim 1, wherein the constraint problem defined by the set of constraints describes desired a distribution of objects at locations and wherein the output properties of Q are at least a partial solution describing a manner of achieving the desired distribution of objects.

24. A computer program product comprising:
a computer usable medium having computer readable code embodied therein for generating at least a partial solution to a constraint problem, the computer readable code comprising:
a module for defining a set of constraints for the constraint problem, the set of constraints including one or more lifted constraints with universally quantified parameters;
a module for applying a procedure to the constraint problem, the procedure for finding the at least partial solution;
a module for formulating the procedure in terms of subsearch problems on the one or more lifted constraints with universally quantified parameters;
a module for performing intelligent subsearch to answer the subsearch problems on the lifted constraints with universally quantified parameters;
a module for determining, responsive the results of the intelligent subsearch, properties of an assignment Q satisfying the defined set of constraints; and
a module for outputting the properties of Q as the at least partial solution to the constraint problem.

25. The computer program product of claim 24, wherein the procedure is a search procedure.

26. The computer program product of claim 25, wherein the search procedure is Walk-SAT.

27. The computer program product of claim 25, wherein the search procedure is a Davis-Putnam procedure.

28. The computer program product of claim 25, wherein at least one lifted constraint is a pseudo-Boolean constraint having one or more universally quantified parameters.

29. The computer program product of claim 24, wherein the procedure is a simplification procedure for finding facts entailed by the constraint problem.

30. The computer program product of claim 24, wherein the procedure is a propagation procedure for finding facts entailed by the constraint problem.

31. The computer program product of claim 24, wherein the formulating module composes:
a module for formulating the procedure in terms of subsearch problems on $S(C,P,u,s)$, where $S(C,P,u,s)$ represents a subset of grounded clauses that would be obtained by grounding a set of clauses C obtained from the defined set of constraints for the constraint problem and restricting the subset to clauses having u literals unvalued by an assignment P and s literals satisfied by the assignment P.

32. The computer program product of claim 31, wherein the procedure is a search procedure and further comprising:
a module for searching for properties of the assignment Q satisfying the defined set of constraints using the search procedure, the searching encountering the subsearch problems on $S(C,P,u,s)$ for assignments P encountered responsive to the search.

33. The computer program product of claim 32, wherein the module for performing intelligent subsearch answers the subsearch problems on $S(C,P,u,s)$.

34. The computer program product of claim 32, wherein the search procedure has the ability to learn lifted clauses during searching and the set of clauses C in $S(C,P,u,s)$ includes lifted clauses learned by the search procedure.

35. The computer program product of claim 34 wherein the lifted clauses learned by the search procedure are obtained responsive to resolution of existing lifted clauses.

36. The computer program product of claim 35, further comprising:
a module for defining a literal l; and
a module for restricting the lifted constraints learned by the search procedure using the defined literal l to produce a set of possibly lifted clauses C(l) having the property that each ground clause obtainable from C(l) contains the literal l;
wherein the set of clauses C in $S(C,P,u,s)$ is the set of possibly lifted clauses C(l).

37. The computer program product of claim 32, wherein the module for searching for properties of the assignment Q comprises:
a module for searching through a sequence of possibly partial assignments P; and
a module for performing intelligent subsearch to answer the subsearch problems for each possibly partial assignment P in the sequence.

38. The computer program product of claim 31, wherein the one or more lifted constraints comprise one or more lifted clauses and wherein C in $S(C,P,u,s)$ is a set of the one or more lifted clauses.

39. The computer program product of claim 31, further comprising:
a module for defining a literal l; and
a module for restricting the defined set of constraints using the defined literal l to produce a set of possibly lifted clauses C(l) having the property that each ground clause obtainable from C(l) contains the literal l;
wherein the set of clauses C in $S(C,P,u,s)$ is the set of possibly lifted clauses C(l).

40. The computer program product of claim 24, wherein the module for performing intelligent subsearch comprises:
a module for performing intelligent subsearch on each lifted constraint in the set to produce a result for each lifted constraint; and
a module for merging the result of each lifted constraint into a merged result.

41. The computer program product of claim 24, wherein the module for performing intelligent subsearch comprises:
a module for using backtracking searches to find relevant assignments to the universally quantified parameters within the one or more lifted constraints.

42. The computer program product of claim 24, wherein the module for performing intelligent subsearch comprises:
a module for converting the subsearch problems into constraint satisfaction problems;
wherein the intelligent subsearch works on the constraint satisfaction problems to answer the subsearch problems.

43. A computer system for generating at least a partial solution to a constraint problem, the computer system comprising:
- a module for defining a set of constraints for the constraint problem, the set of constraints including one or more lifted constraints with universally quantified parameters;
- a module for applying a procedure to the constraint problem, the procedure for finding the at least partial solution;
- a module for formulating the procedure in terms of subsearch problems on the one or more lifted constraints with universally quantified parameters;
- a module for performing intelligent subsearch to answer the subsearch problems on the lifted constraints with universally quantified parameters;
- a module for determining, responsive the results of the intelligent subsearch, properties of an assignment Q satisfying the defined set of constraints; and
- a module for outputting the properties of Q as the at least partial solution to the constraint problem.

44. The computer system of claim 43, wherein the procedure is a search procedure.

45. The computer system of claim 44, wherein the search procedure is Walk-SAT.

46. The computer system of claim 44, wherein the search procedure is a Davis-Putnam procedure.

47. The computer system of claim 44, wherein at least one lifted constraint is a pseudo-Boolean constraint having one or more universally quantified parameters.

48. The computer system of claim 43, wherein the procedure is a simplification procedure for finding facts entailed by the constraint problem.

49. The computer system of claim 43, wherein the procedure is a propagation procedure for finding facts entailed by the constraint problem.

50. The computer system of claim 43, wherein the formulating module comprises:
- a module for formulating the procedure in terns of subsearch problems on S(C,P,u,s), where S(C,P,u,s) represents a subset of grounded clauses that would be obtained by grounding a set of clauses C obtained from the defined set of constraints for the constraint problem and restricting the subset to clauses having u literals unvalued by an assignment P and s literals satisfied by the assignment P.

51. The computer system of claim 50, wherein the procedure is a search procedure and further comprising:
- a module for searching for properties of the assignment Q satisfying the defined set of constraints using the search procedure, the searching encountering the subsearch problems on S(C,P,u,s) for assignments P encountered responsive to the search.

52. The computer system of claim 51, wherein the module for performing intelligent subsearch answers the subsearch problems on S(C,P,u,s).

53. The computer system of claim 51, wherein the search procedure has the ability to learn lifted clauses during searching and the Set of clauses C in S(C,P,u,s) includes lifted clauses learned by the search procedure.

54. The computer system of claim 53 wherein the lifted clauses learned by the search procedure are obtained responsive to resolution of existing lifted clauses.

55. The computer system of claim 54, further comprising:
- a module for defining a literal l; and
- a module for restricting the lifted constraints learned by the search procedure using the defied literal l to produce a set of possibly lifted clauses C(l) having the property that each ground clause obtainable from C(l) contains the literal l;
- wherein the set of clauses C in S(C,P,u,s) is the set of possibly lifted clauses C(l).

56. The computer system of claim 51, wherein the module for searching for properties of the assignment Q comprises:
- a module for searching through a sequence of possibly partial assignments P; and
- a nodule for performing intelligent subsearch to answer the subsearch problems for each possibly partial assignment P in the sequence.

57. The computer system of claim 50, wherein the one or more lifted constraints comprise one or more lifted clauses and wherein C in S(C,P,u,s) is a set of the one or more lifted clauses.

58. The computer system of claim 50, further comprising:
- a module for defining a literal l; and
- a module for restricting the defined set of constraints using the defined literal l to produce a set of possibly lifted clauses C(l) having the property that each ground clause obtainable from C(l) contains the literal l;
- wherein the set of clauses C in S(C,P,u,s) is the set of possibly lifted clauses C(l).

59. The computer system of claim 43, wherein the module for performing intelligent subsearch comprises:
- a module for performing intelligent subsearch on each lifted constraint in the set to produce a result for each lifted constraint; and
- a module for merging the result of each lifted constraint into a merged result.

60. The computer system of claim 43, wherein the module for performing intelligent subsearch comprises:
- a module for using backtracking searches to find relevant assignments to the universally quantified parameters within the one or more lifted constraints.

61. The computer system of claim 43, wherein the module for performing intelligent subsearch comprises:
- a module for converting the subsearch problems into constraint satisfaction problems;
- wherein the intelligent subsearch works on the constraint satisfaction problems to answer the subsearch problems.

* * * * *

UNITED STATES PATENT AND TRADEMARK OFFICE
CERTIFICATE OF CORRECTION

PATENT NO.    : 6,556,978 B1
DATED         : April 29, 2003
INVENTOR(S)   : Matthew L. Ginsberg et al.

It is certified that error appears in the above-identified patent and that said Letters Patent is hereby corrected as shown below:

Column 19,
Lines 56 and 57, should read as follows:
-- 31. The computer program product of claim 24, wherein the formulating module comprises: --

Colunm 21,
Line 40, should read as follows:
-- a module for formulating the procedure in terms of sub- --

Column 22,
Line 21, should read as follows:
-- a module for performing intelligent subsearch to answer --

Signed and Sealed this

Twenty-third Day of September, 2003

JAMES E. ROGAN
*Director of the United States Patent and Trademark Office*